July 21, 1936.  H. C. GEIST  2,048,331

AUTOMATIC WORK FEEDING AND REVERSING MECHANISM

Filed Oct. 30, 1934  6 Sheets-Sheet 1

Inventor
Henry C. Geist,

By

Attorney

July 21, 1936.  H. C. GEIST  2,048,331
AUTOMATIC WORK FEEDING AND REVERSING MECHANISM
Filed Oct. 30, 1934   6 Sheets-Sheet 3

Inventor
*Henry C. Geist,*
By
Attorney

July 21, 1936.  H. C. GEIST  2,048,331

AUTOMATIC WORK FEEDING AND REVERSING MECHANISM

Filed Oct. 30, 1934  6 Sheets-Sheet 5

Inventor
Henry C. Geist,

Attorney

Patented July 21, 1936

2,048,331

UNITED STATES PATENT OFFICE 2,048,331

AUTOMATIC WORK FEEDING AND REVERSING MECHANISM

Henry C. Geist, Waynesboro, Pa.

Application October 30, 1934, Serial No. 750,698

13 Claims. (Cl. 10—91)

In that type of machine where the opposite ends of articles are to be successively worked upon, as for example in threading nipples, it is the common practice to locate the work-performing members, as for instance, threading die heads, side by side. In nipple threading machines the nipple to be threaded is first advanced by the workman to one threading die, which threads one end of the nipple. After threading, the workman removes the nipple from the holder, reverses it and places it in another holder which is advanced to the other die head and this second die head then threads the other end of the nipple.

The primary object of the present invention is to provide an operative structure by which nipples can be successively presented to one die head for threading, and thereafter these nipples are automatically reversed and presented to the other die head, so that the unthreaded ends are in turn threaded.

An embodiment of the invention that has been found entirely practicable for the purpose is shown in the accompanying drawings, wherein.

Figure 1:
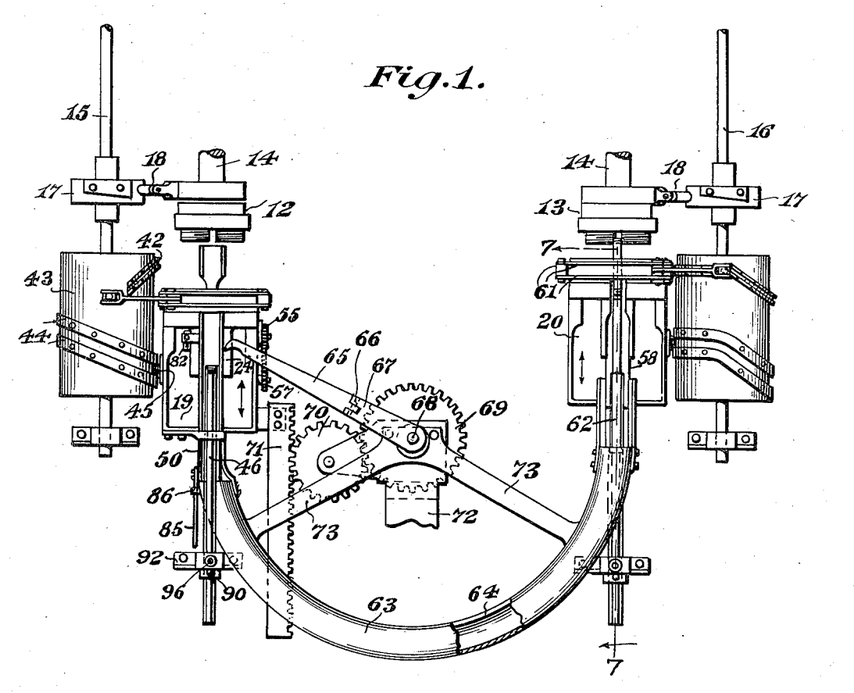
Figure 1 is a plan view of the feeding and reversing mechanism.

Referring first to Figure 1, which is somewhat diagrammatic in its character, two work-performing members are shown in the form of threading die heads 12 and 13 carried upon shafts 14 and operated in unison by any suitable mechanism. This apparatus is well known in the art, and is in common practice so that it is believed to be unnecessary to illustrate the mechanism in detail. The die heads are automatic in their character, that is, they close and open periodically so as to thread the articles submitted to them and then release the same. Thus in the present embodiment two side shafts 15 and 16 are shown carrying cams 17 that operate on the arms 18 in a manner well understood to control the action of the die heads.

Associated with the first die head 12 is a reciprocatory carriage 19 that moves toward and from said die head 12. Similarly cooperating with the second die head 13 is a second reciprocatory carriage designated generally by the reference numeral 20, and also movable toward and from said die head 13. Referring now more particularly to Figures 3, 4, 5, and 6, the first carriage 19 is illustrated in detail.

Figures 3, 10:
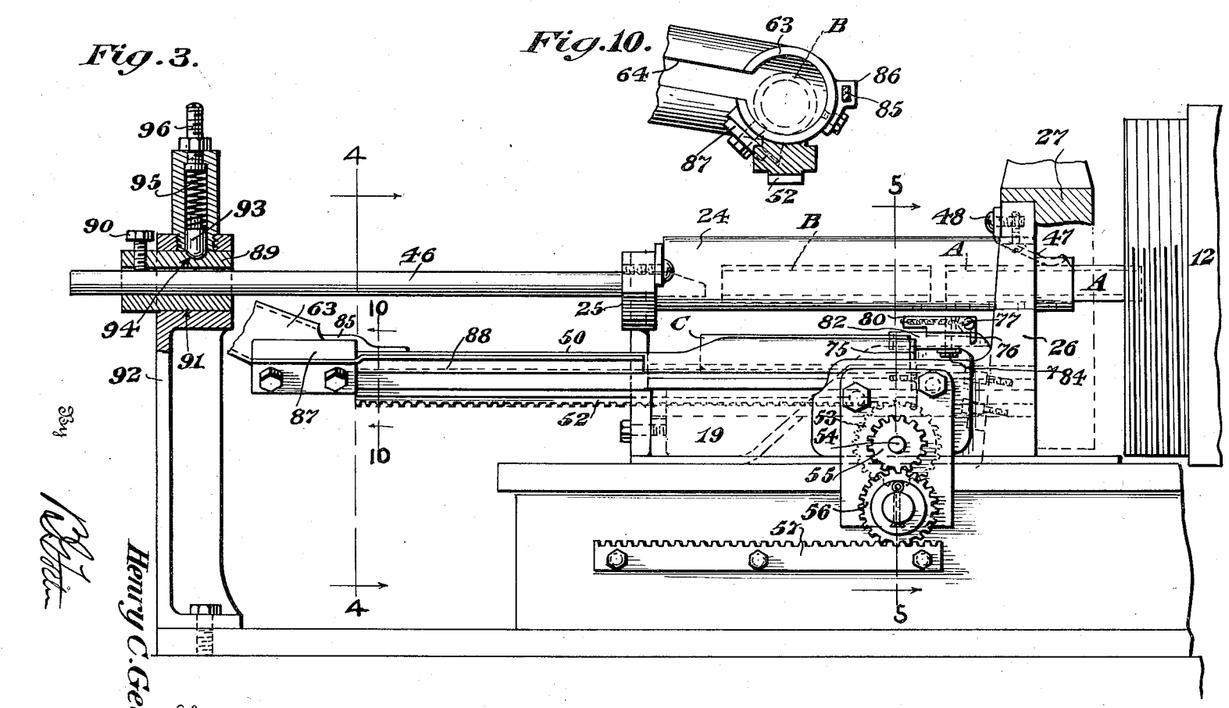
Figure 3 is a side elevation of the feeding mechanism for the first die head.
Figure 10 is a cross sectional view on the line 10—10 of Figure 3.
Figures 6, 8:
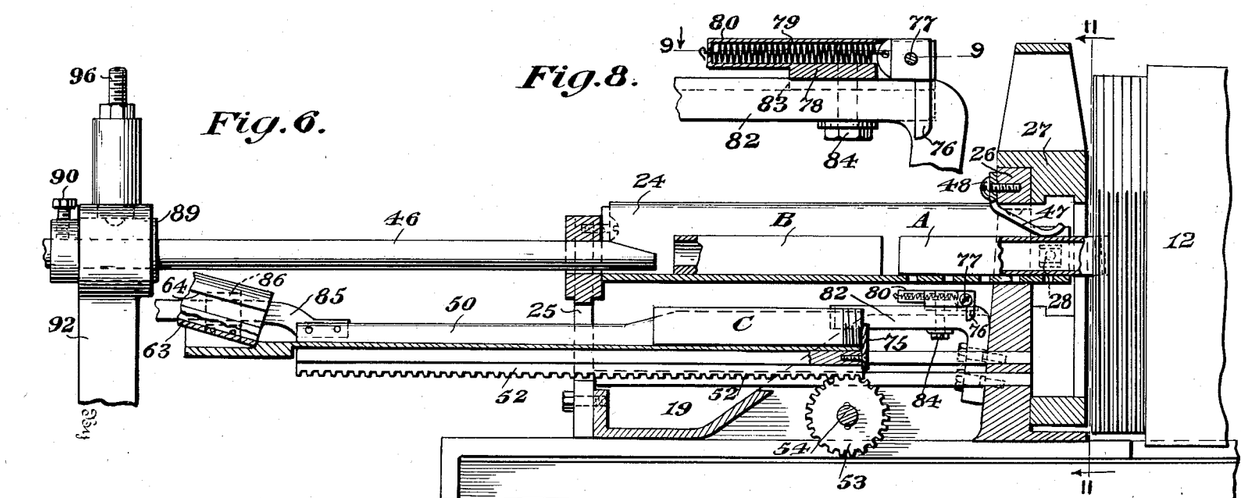
Figure 6 is a vertical longitudinal sectional view through the first feeding mechanism and is taken on the line 6—6 of Figure 5.
Figure 8 is a detail sectional view on the line 8—8 of Figure 5.

A portion of the base or support for the apparatus includes spaced guideways 21 of dovetail formation, and in which the carriage body reciprocates. Thus said body has at one side a receiving groove 22 for one of the guideways 21, and fastened to the opposite side is a gib 23 that engages the other guideway. Referring particularly to Figures 3 and 6, it will be noted that this carriage supports a work holder, in the form of a horizontal trough 24, the rear end being mounted on a bracket 25, the front end being engaged in a supporting frame 26 that constitutes a part of said carriage. This trough is so positioned that its front end alines with the receiving socket of the threading die head 13, so that when the article, as a nipple A, projects from the end of the same, as shown in Figure 6, it will enter the die head and be threaded thereby.

Figure 11:
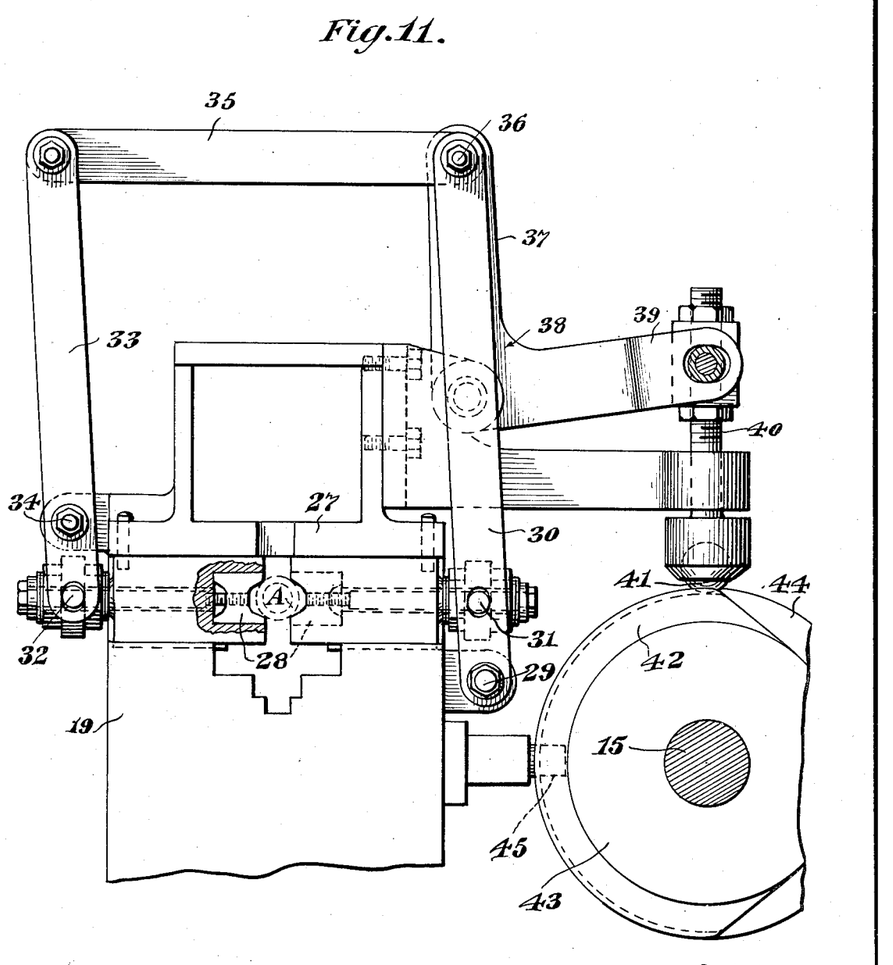
Figure 11 is a sectional view on the line 11—11 of Figure 6.

In order to clamp the nipples while they are being threaded and thus prevent their rotation with the die head, there is mounted on the frame 26 a work clamping mechanism. This, as shown more particularly in Figure 11 consists of an open frame 27, in the opposite sides of which are reciprocatory gripping dies 28 that engage opposite sides of the nipple A. These dies are actuated by lever mechanism, that is to say, one of said dies is pivotally connected at 31 between the ends of a lever 30 fulcrumed at its lower end at 29. The other die has a pivotal connection 32 with the lower end of a lever 33 fulcrumed between its ends as at 34. The upper ends of the two levers are connected by a link 35 and the lever 30 has a pivotal connection also at 36 with the outstanding arm 37 of a bell crank lever 38. This bell crank has an outstanding arm 39 connected to a vertically reciprocating plunger 40, and the plunger 40 has a bearing ball 41 at its lower end that operates on a cam track 42 carried by a cam head 43 that is fixed to the shaft 15. It will be understood that as the shaft 15 rotates, the cam operates at the proper time to move the bell crank 38, and thereby move towards each other the dies 28 so as to grip the nipple A.

The carriage 19 in turn is reciprocated by a cam track 44 located on the cam head 43 and having engaged therewith a roller 45 journaled on one side of the carriage. It will be understood that the cam tracks are so formed and related that when the carriage is advanced toward the threading die 12, at the proper time the article in the trough is gripped and is held gripped during the threading operation, after which the die head opens, the grip is released and the carriage moves rearwardly or away from the die head.

Now referring again to Figures 3 and 6 particularly, it will be noted that there is provided an ejecting plunger in the form of a horizontal rod 46 that extends into the trough 24, so that it is in the path of nipples deposited in said trough. It will also be noted that the trough is long enough to receive two nipples. During the threading of the first nipple A, a second nipple B is deposited therein between the nipple A and the front end of the ejector 46. The consequence is that when the carriage moves rearwardly from the threading die head 12, after the nipple A has had one end threaded, the ejector 46 being stationary and the trough moving rearwardly, the unthreaded nipple B striking the front end of the ejector is stopped, thereby stopping the nipple A and consequently said trough moves from beneath the nipple A, and the latter drops. In order to secure this operation and also obtain a certain amount of frictional bearing there is preferably provided a spring 47 that bears upon the upper sides of the nipples as they are respectively pushed into place, this spring being mounted, as shown at 48, on the frame 27. When the nipple A drops from the trough 24, the nipple B takes its place in projecting relation, and consequently when the carriage again moves toward the threading die 12, the nipple B is in position to be gripped and threaded.

Figure 4:
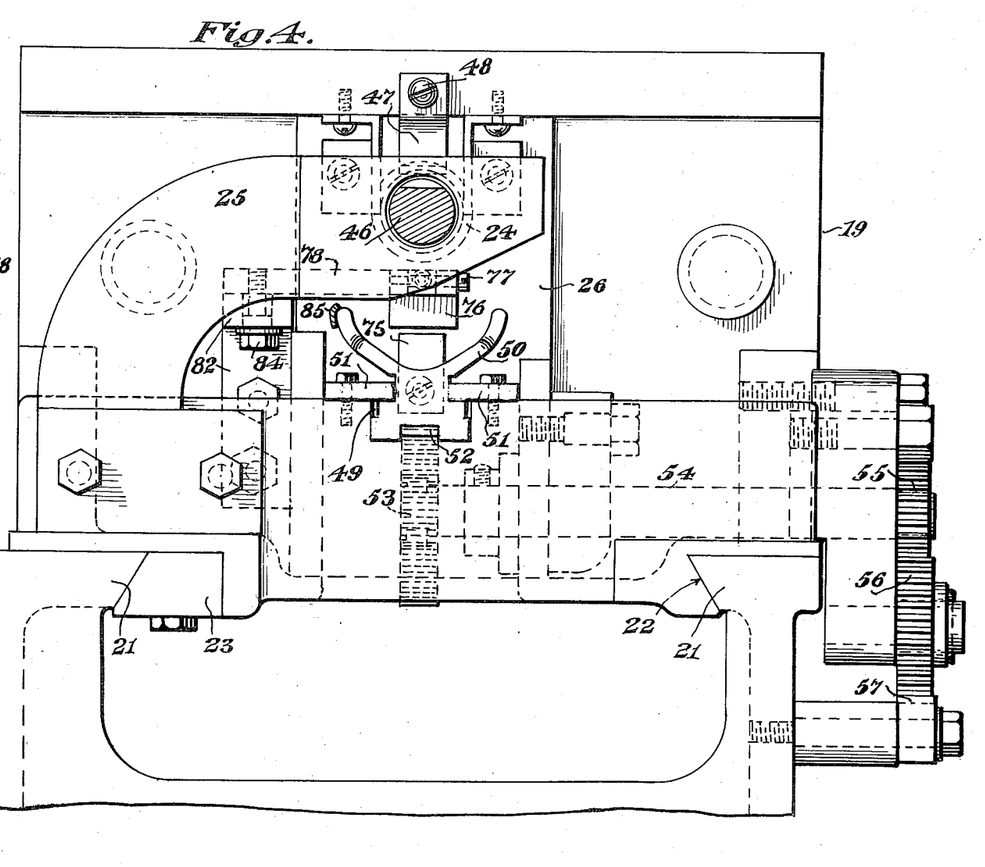
Figures 4 and 5 are respectively cross sectional views on the lines 4—4 and 5—5 of Figure 3.
Figure 5:
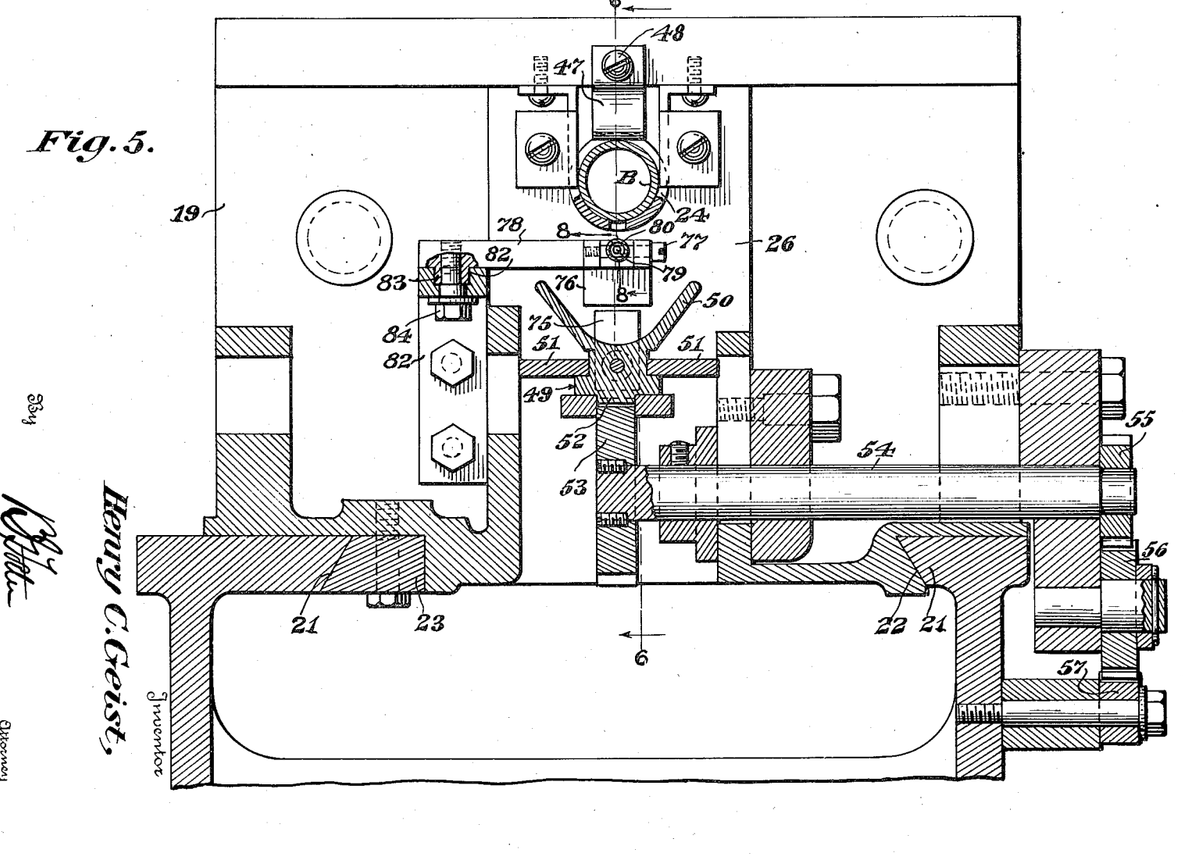

The carriage 19, as shown more clearly in Figure 4, has a central horizontal guideway 49, in which is mounted a reciprocatory nipple-receiving trough 50 that is held in place by retaining strips 51. This trough 50 operates oppositely to the carriage. That is to say, when the carriage moves forwardly to carry a nipple into position to be threaded, the trough 50 moves rearwardly, and vice versa, when the carriage moves rearwardly the trough 50 moves forwardly and at a higher rate of speed than the rearward movement of the carriage, so that when the nipple as A is ejected from the upper trough, it drops into the lower trough. The mechanism for operating the trough 50 is preferably as follows: its bottom is a rack 52 engaged by a pinion 53 on a shaft 54 that is journaled transversely on the carriage. This structure is more clearly shown in Figure 5. The outer end of the shaft carries a pinion 55 that is in mesh with an idler 56, and this idler in turn is also in mesh with a rack 57 fixed to the side of the support (see Fig. 3).

Figure 7:
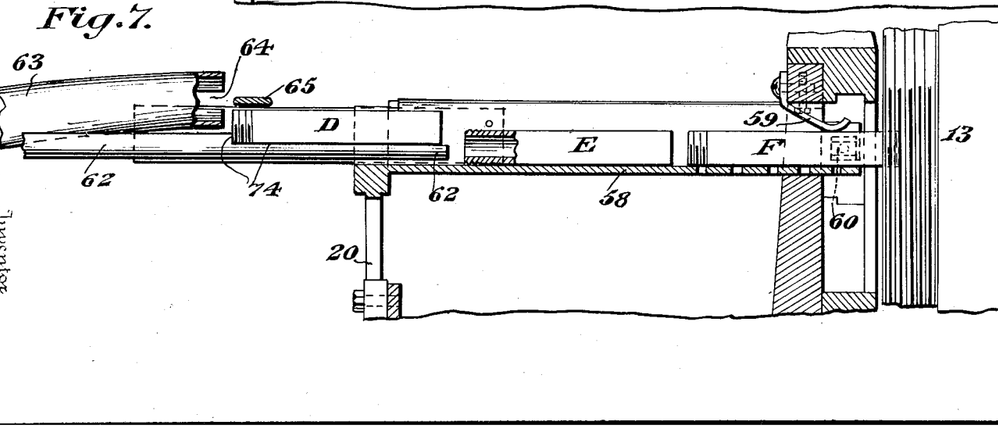
Figure 7 is a longitudinal sectional view on the line 7—7 of Figure 1.

Now referring to the second carriage 20, which cooperates with the second threading die 13, and as shown in detail in Figure 7, this carriage also has a work-receiving trough 58 adapted to present the nipples in reversed relation, or with their unthreaded ends to the threading die head 13. The trough has at its presentation end a frictional clamping spring 59, and also gripping jaws, one of which is shown at 60. It will be understood that these dies and the mechanism for operating them, are the same as with the first machine and are shown generally at 61 (see Fig. 11). Cooperating with this trough 58 is an ejector plunger 62 so disposed that when the carriage moves rearwardly after a nipple has been threaded, it will through the interposition of an intermediate nipple, cause the completely threaded nipple to be ejected from the trough 58 and said nipple will drop down into a suitable receiver. The action has now been completed.

Figure 2:
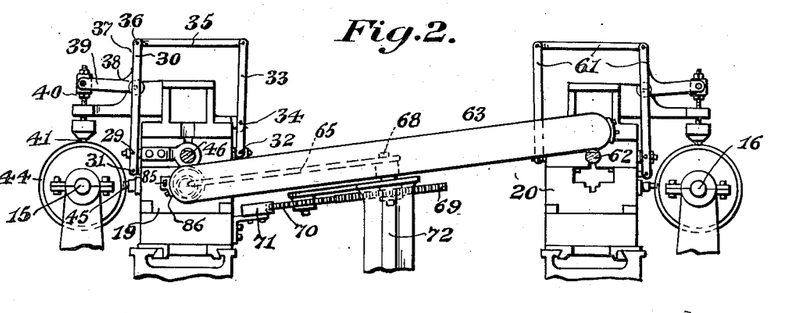
Figure 2 is a rear elevation of the same.

In order to transfer the nipples from the receiving trough 50 of the first carriage to the work holding trough 58 of the second carriage, the following mechanism is employed. A substantially semi-circular tubular guideway 63 extends from a point in rear of the receiving trough 50 to a point in rear of the work-holding trough 58 of the second carriage 20. This, as shown in Figure 2 is at an inclination in order that a nipple traversing the same will be carried from the lower level of the trough 50 to the upper level of the trough 58, the latter of course being at the same level as the trough 24 of the first carriage. This tubular guideway 63 has its inner side provided with a longitudinal slot 64 in order to permit the travel therethrough of the outer free end of a transfer finger 65 that is pivoted at 66 to a swinging arm 67. This arm is carried on the upper end of a vertical shaft 68 which also has fixed thereto a spur gear 69. The gear 69 is in mesh with an idler 70 that is engaged with a rack 71 fixed to and reciprocating with the first carriage 19. Incidentally, it will be noted by reference to Figure 1 that this gearing and arm is supported on a bracket 72 and that the bracket in turn has fastened thereto radial arms 73 supporting the guideway 63.

The path of movement of the transfer arm 65—67 is such that when the arm is in its left-hand position, or as shown in Figure 1, its free end is slightly beyond the trough 50, and its action is such that when the trough 50 has moved rearwardly so as to carry the received nipple to a point beyond the free end of the arm, said arm will swing behind the nipple, push it into the adjacent open end of the guideway 63, through said guideway and out of the same. In doing this it will be noted that the nipple is reversed, so that its former unthreaded end is now forwardly or in the proper direction to be operated on by the second die head 13. The thus delivered and reversed nipple, however, is not dropped directly into the work-holding trough of the second carriage 50, but is deposited upon the front end portion of the ejector rod 62, said rod being cut away to provide a supporting seat 74 for holding the nipple as shown in Figure 7. When the nipple thus drops on to the seat 74 the finger 65 can pass over it as indicated.

Figure 9:
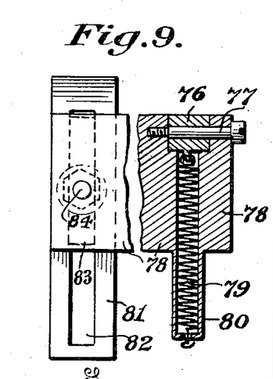
Figure 9 is a horizontal sectional view on the line 9—9 of Figure 8.

In order to secure the proper movement of the nipples and prevent their becoming canted or out of place, there are various detail features that are preferably employed. Thus referring again to the receiving trough 50, it is to be noted that there is secured to its front end an abutment plate 75 which insures that the nipple will move rearwardly with the trough. To prevent the nipple again going forwardly with said trough 50, there is provided a stop trip 76, shown particularly in Figure 6, and in detail in Figures 8 and 9. This trip is a depending finger pivoted at 77 so that it may swing rearwardly but not forwardly. It is journaled on a plate 78 and is yieldingly held in its depending position by a coiled spring 79 attached thereto, and located in a barrel 80 on said plate. The plate 78 in turn is supported at one side on a bracket 81 fixed to the part 26 of the carriage 19. This plate is adjustable on said bracket, the latter having a slot 82 and the former having a portion 83 engaged in said slot, the parts being normally held against movement by a suitable screw 84. When the trough 50 moves rearwardly away from the die head 12 carrying a nipple, this nipple passes under the finger 76 which is raised thereby and drops down again behind the nipple. Therefore when the trough 50 moves forwardly, the trip which is now engaged behind the nipple, moves rearwardly with the carriage and thus causes the nipple to move toward the receiving end of the guideway 63.

In order to insure the nipple entering the receiving end of the curved guideway 63, the trough 50 moves to a position beneath the end of said guideway, and said trough also carries a directing arm 85 which moves along one side of the guideway and is itself slidably engaged in a retaining clip 86 secured to the guideway. On the side opposite the arm 85 and secured to the end of the guideway 63 through the medium of a block 87, is a forwardly extending arm 88 on which the adjacent portion of the trough 50 rides, thus insuring its proper support and its movement to a definite position with respect to the receiving end of the guideway 63.

In case there is any sticking or holding of the nipples that would prevent their ejection from the respective troughs 24 and 58, provision is made for the release of the ejecting rods 46 and 62, so that they may move rearwardly under an abnormal pressure. The structure is shown in detail in connection with the rod 46 and is the same as that used on rod 62. Thus by referring to Figures 3 and 6, it will be noted that the rod 46 is surrounded by a sleeve 89 that is fixed thereto by a set screw 90. This incidentally permits the adjustment of the rod so that it will properly cooperate with nipples of different lengths. The sleeve 89 is engaged in a horizontal opening 91 of a supporting standard 92 and is slidable from the same. It is, however normally held against detachment by a plunger 93 having a rounded lower end engaged in a correspondingly shaped socket 94 in the sleeve 89. The plunger is pressed downwardly by a spring 95, the tension of which can be varied by a tension screw 96 pressing upon the spring. Obviously the plunger 93 by reason of its engagement with the sleeve, will normally prevent any retrograde movement of the rod 46, but if the pressure is great enough the plunger will ride out of its socket and the sleeve will be pushed out of the standard.

The operation of the mechanism briefly described is as follows. Assuming that a nipple, as A, has been placed in the trough 24, when the carriage advances toward the threading die 12, this nipple is gripped by the jaws 28 and the projecting end of the nipple is threaded as indicated in Figures 3 and 6. During this operation a second nipple B is deposited behind the nipple A, either manually or by any well-known type of feeding mechanism. When the threading dies open to release the nipple A, the carriage 19 starts rearwardly, and at the same time the lower trough 50 advances. The result is that the nipple B, being brought against the front end of the ejector 46, is stopped, which in turn stops the partly threaded nipple A. The trough 24, however continues its movement rearwardly until the nipple drops therefrom. By this time the front end of the trough 50 is beneath the nipple and catches the same, or in other words, the nipple now comes into the position of the nipple C. After the ejection of the nipple A, the nipple B takes its place, or in other words, takes a position ready for the threading operation. As the carriage 19 again advances to carry the nipple B to its threading operation, the trough 50 moves rearwardly, carrying the nipple C with it, and when a reverse action takes place, this nipple C is not only held by the detent 76 so that it cannot return with the trough 50 but the detent is carried rearwardly by the retreating carriage and thus moves the nipple to the guideway 63. As the carriage 19 again moves forwardly, it of course correspondingly moves the rack 71, causing the free end of the finger 65 to now swing behind the nipple C, push it into the curved guideway 63, which turns the nipple end for end and discharges it on to the supporting portion 74 of the ejector rod 62, or as shown at D in Figure 7. Here it lies until a succeeding nipple is brought around by the finger 65. This succeeding nipple of course pushes the nipple D off the support and into the trough 58, as shown at E. When the carriage 20 and trough 58 move rearwardly the nipple of the position E is brought against the end of the ejector rod 62, and is stopped or in other words is brought into the trough into the position indicated at F. It thus advances with the carriage 20 and trough 58 until gripped by the part 60 and is threaded by the die head 13. While being threaded, another nipple brought by the transfer arm 65, pushes the nipple that is now in the position D into the position E, or behind the nipple in the position F. Therefore when the carriage 20 moves rearwardly the nipple F, having been released from the threading die head 13 and by the gripper jaws 60 is held stationary until the trough 58 moves from beneath it, whereupon it drops into any suitable receiver at the base of the machine.

It will thus be seen that a succession of operations is periodically taking place and these are so timed with respect to the operations of the threading die heads and the carriages that when one of the die heads is in operation on a nipple and when the carriage is substantially at a standstill, except for its slight movement to accommodate the threading mechanism, the other carriage is in operation to effect the feeding action. These two operations are alternate. Consequently it is to be noted that but one threading action is taking place at a time, making a more even distribution of power and avoiding excessive periodic loads on the machinery. This is due to the fact that the two sets of cams are in substantially reverse relation so that when one carriage is advanced and stationary due to the dwell portion of its cam, the portion of the other cam which effects the movements of the carriage is in operation. It is thought that this will be clear by reference to Figure 1.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a machine of the type described, the combination with a pair of work-performing members, of a work carriage for each member movable toward and from the same to present different portions of the work to said members for performance thereon, a guide for directing the work from one carriage to the other and reversing its position during such transfer, and a transferring device for moving the work from one carriage after it has been operated on through the guide and depositing it in reversed position in the other carriage to be operated on by the member associated with said latter carriage.

2. In a machine of the type described, the combination with a pair of work-performing members, of a work carriage for each member movable toward and from the same to present the work to said members for performance thereon, a guide for directing the work from one carriage to the other and reversing its position during such transfer, a transferring device for moving the work from one carriage after it has been operated on, through the guide and depositing it in reversed position in the other carriage to be operated on by the member associated with said latter carriage, and means for operating the transferring device by one of the carriages.

3. In a machine of the type described, the combination with threading die heads located side by side, of a work carriage for each movable toward and from its die head, means for alternately moving said carriages toward and from their respective die heads, means on each carriage for positioning an article to be threaded by its die head when the carriage is advanced, a curved guideway for the work in rear of the carriage and leading from one to the other, and means operating when the carriage is moved away from one die head for removing the threaded article from said carriage, reversing it and transferring it by the guideway to the other carriage to be carried by the latter in its associated die head for threading.

4. In a machine of the type described and having a bed, the combination with a work-performing member, of a carriage movable relative to the bed toward and from the member and having a work holder for carrying a piece of work to a position to be operated on by said member, a carrier cooperating with the carriage and movable relative to the bed and in an opposite direction to the carriage, and means for advancing the carrier to a position in advance of the work holder and below the same when the carriage retreats from the member to receive the work operated on by the member.

5. In a machine of the type described, the combination with a work performing member, of a carriage movable toward and from the member and having means for carrying a piece of work to a position to be operated on by said member, a carrier cooperating with the carriage and movable in an opposite direction thereto, and means for advancing the carrier at a greater speed than the speed of return of the carriage to place it in a position to receive the work operated on by the member.

6. In a machine of the type described, the combination with a work-performing member, of a carriage movable toward and from the same, a work holding trough mounted on the carriage for carrying work to the member, a device for dislodging the work from the trough after it has been operated upon by the member and on the rearward movement of the carriage, and a work receiving trough mounted on the carriage below the work holding trough, and means for moving the trough in a direction opposite to that of the carriage and to a position to receive the work dislodged from the work holding trough.

7. In a machine of the type described, the combination with a support, of a threading die head, a reciprocatory carriage mounted on the support and movable toward and from the die head, a trough for holding an article to be presented to the die head for threading carried by the carriage, article-clamping means also carried by the carriage, means for operating the clamping means to clamp the article to the carriage when presented to the die head, an ejector in the path of the article when carried away from the die head, a reciprocatory receiving trough for ejected articles mounted on the carriage beneath the holding trough and movable relative to the carriage, and gearing mounted on said support, carriage and receiving trough for advancing the trough as the carriage retreats to place the receiving trough beneath the article as it is dislodged.

8. In a machine of the type described, the combination with a support, of a threading die head, a reciprocatory carriage mounted on the support and movable toward and from the die head, a trough for holding an article to be presented to the die head for threading carried by the carriage, article clamping means also carried by the carriage, means for operating the clamping means to clamp the article when presented to the die head, an ejector in the path of the article when carried away from the die head, a reciprocatory receiving trough for ejected articles mounted on the carriage beneath the holding trough, gearing mounted on the said support, carriage and receiving trough for advancing the trough as the carriage retreats to place the receiving trough beneath the article as it is dislodged, means for insuring the movement of the article rearwardly with the receiving trough, and means for preventing the article advancing with the receiving trough.

9. In a machine of the type described, the combination with a first and a second threading die head, said heads being located side by side, of a reciprocatory carriage movable toward and from the first die head and having a trough for the reception of an article to be threaded, an article clamp on the carriage, means for operating the clamp to hold an article when the carriage moves toward the first die head and releasing the clamp when the carriage is moved away from the same, an ejector plunger that operates to eject the threaded article when the carriage moves away from the first die head, a second trough movably mounted on the carriage below the first trough, means for causing the second trough to move toward the first die head when the carriage moves away from the same and to a position to receive the threaded article ejected from said first trough, a second carriage movable toward and from the second die head and having an article holding trough and a clamp for the article placed therein, a second ejector for the trough of the second carriage that operates to eject the article therein on the movement of the second carriage away from the second die head and after the article has been threaded by the second die head, said second ejector having a support for temporarily holding articles to be deposited in the trough of the second carriage, a curved guideway extending from the rear of the first carriage to said supporting portion of the second ejector, a pivoted arm swinging through the curved guideway and acting to transfer the threaded article from the second trough of the first carriage to the supporting portion of the second ejector and reverse the position of the article, means for positively swinging the arm, and means for alternately moving the carriages, one forwardly and the other backwardly.

10. In a machine of the type described, the combination with a pair of work-performing members located substantially side by side, of means for moving an elongated article longitudinally, thereby presenting one end thereof to be worked upon to one of the members, and means for reversely moving said article longitudinally away from said first member after being worked upon by the first member, reversing its position, and moving it again longitudinally to the other member to present its other end to the other member to be worked upon thereby.

11. In a machine of the type described, the combination with a pair of work-performing members located substantially side by side, of an article-holding carriage for advancing an article to be worked upon to one of the members and for withdrawing it rearwardly after such work is performed, a second article-holding carriage for advancing the article to the other member, means for moving the article rearwardly from the first carriage after the rearward withdrawal thereof, and means for delivering it to the second carriage from the rear thereof, and in the direction in which the said carriage advances the article from one carriage to the other and changing its relative position in the second carriage.

12. In a machine of the type described, the combination with a pair of work-performing members located substantially side by side, of an article-holding carriage for advancing an article to be worked upon to one of the members and for withdrawing it after such work has been performed, a second article-holding carriage for advancing the article to the other member, and means for removing the article from the first carriage at the end of its withdrawal and to the rear thereof and for delivering it to the other carriage and reversing its position before delivering it to the second carriage.

13. In a machine of the type described and having a bed, the combination with a work-performing member, of a carriage movable relative to the bed toward and from the member and having means for carrying a piece of work to a position to be operated on by said member, a carrier cooperating with the carriage for moving the work operated on by the member and movable relative to the bed in an opposite direction to the carriage, and means for advancing the carrier when the carriage retreats from the member and placing it in a position to receive the work operated on by the member.

HENRY C. GEIST.